US010024524B2

(12) United States Patent
Zhang

(10) Patent No.: US 10,024,524 B2
(45) Date of Patent: Jul. 17, 2018

(54) EASY-MAINTAINING LED LAMP

(71) Applicant: Shenzhen OKT Lighting Co., Ltd., Shenzhen, Guangdong (CN)

(72) Inventor: Zhiwu Zhang, Guangdong (CN)

(73) Assignee: Shenzhen OKT Lighting Co., Ltd. (CN)

( * ) Notice: Subject to any disclaimer, the term of this patent is extended or adjusted under 35 U.S.C. 154(b) by 0 days.

(21) Appl. No.: 15/343,356

(22) Filed: Nov. 4, 2016

(65) Prior Publication Data

US 2018/0128456 A1 May 10, 2018

(51) Int. Cl.

| | |
|---|---|
| ***G02B 6/00*** | (2006.01) |
| ***F21V 17/10*** | (2006.01) |
| ***F21S 8/04*** | (2006.01) |
| ***F21V 7/09*** | (2006.01) |
| ***F21V 13/04*** | (2006.01) |
| *F21Y 115/10* | (2016.01) |

(52) U.S. Cl.

CPC ............ *F21V 17/108* (2013.01); *F21S 8/043* (2013.01); *F21V 7/09* (2013.01); *F21V 13/04* (2013.01); *F21Y 2115/10* (2016.08)

(58) Field of Classification Search

CPC ........ F21V 7/0008; F21V 19/00; F21V 21/02; G02B 6/0011; G02B 6/0073; G02B 6/0078; G02B 6/0088

See application file for complete search history.

(56) References Cited

U.S. PATENT DOCUMENTS

| | | | | |
|---|---|---|---|---|
| 9,100,216 | B2 * | 8/2015 | Zhang | H04L 12/4654 |
| 9,335,041 | B2 * | 5/2016 | Marquardt | F21V 33/006 |
| 9,383,508 | B2 * | 7/2016 | Getzinger | G02B 6/0088 |
| 9,666,744 | B2 * | 5/2017 | Clements | H01L 31/18 |
| 9,946,012 | B2 * | 4/2018 | Blessitt | G02B 6/0088 |
| 2013/0279198 | A1 * | 10/2013 | Lin | G02B 6/0011 362/613 |

* cited by examiner

*Primary Examiner* — Peggy Neils

(57) ABSTRACT

The present invention relates to an easy-maintaining LED lamp comprising a lamp body, on which is disposed a mounting frame, wherein the mounting frame comprises two supporting frames, which are respectively connected to the corresponding two ends of the lamp body, wherein a mounting plate is disposed at the upper end of the mounting frame, wherein a plurality of locking holes is disposed on the mounting plate, wherein at least two joint holes are disposed at intervals on the supporting frame, wherein a locking piece extending toward the inner side is disposed in the joint hole, wherein two cover plates are respectively disposed at the two ends of the lamp body, wherein a plurality of fasteners, which is connected to the corresponding locking piece, is disposed at the outer side of one cover plate.

8 Claims, 3 Drawing Sheets

EASY-MAINTAINING LED LAMP

TECHNICAL FIELD OF THE INVENTION

The present invention relates to the technical field of LED lighting fixtures, and more particularly, to an easy-maintaining LED lamp.

BACKGROUND OF THE INVENTION

A LED (light emitting diode) is a solid-state semiconductor device capable of directly transferring the electrical energy into a visible light. LEDs are highly efficient, consume low energy, emit high-quality light rays, have long life-spans and are eco-friendly. Thus, LEDs are widely used as the main light-emitting device in many technical fields, replacing traditional light sources. LEDs are usually arranged in dot arrays, forming a light-emitting base board or light-belt structure. Compared with traditional light sources, LED can be mounted on flattened lamp holders, which can reduce the occupancy rate of the spatial height and improve the coverage rate of the light ray, and enhances the lighting effect.

The lamp panel of the various LED ceiling lamps currently sold in the market is not much different from that of the traditional fluorescent lamp and ceiling lamp-they merely use the LED light source to replace the traditional fluorescent tube and energy-saving tube. In the prior art, the lamp panel of the LED ceiling lamp is still fixed to the ceiling through the screws. These LEDS are difficult to clean—specifically, the light panel and light emitting surface are difficult to maintain. Even worse, the light transmittance may be sharply decreased due to the dust accumulated after prolonged use. For an ultra-thin ceiling lamp, the assembly, disassembly and maintenance of the lamp panel and the LED base board at a high height are especially inconvenient for the users. In conclusion, the shortcomings of the prior art are urgent problems that need to be solved for those skilled in this field.

SUMMARY OF THE INVENTION

The purpose of the present invention is to solve the shortcomings of the prior art and provide an easy-maintaining LED lamp having a reasonable structure, which can be integrally disassembled.

To achieve the above purpose, the present invention adopts the following technical solution:

The easy-maintaining LED lamp of the present invention comprises a lamp body, on which is disposed a mounting frame. The mounting frame comprises two supporting frames, which are connected to the corresponding two ends of the lamp body. The supporting frame is vertically disposed, and a mounting plate is disposed at the upper end of the mounting frame. A plurality of locking holes is disposed on the mounting plate. At least two joint holes are disposed at intervals on the supporting frame. A locking piece extending toward the inner side is disposed in the joint hole. Two cover plates are respectively disposed at the two ends of the lamp body. A plurality of fasteners, which is connected the corresponding locking piece, is disposed at the outer side of one cover plate. Additionally, a plurality of removable buckles, which is connected to the corresponding locking piece, is disposed at the outer side of the other cover plate.

In another aspect of the present invention, a folding piece, which can extend horizontally toward the outer side, is disposed at the upper end of the supporting frame. The mounting plate is vertically disposed, and the lower end of the mounting plate is firmly connected to the folding piece. A plurality of locking holes is disposed at intervals on the mounting plate along the horizontal direction.

In another aspect of the present invention, a right-angled buckling plate is disposed at the lower end of the support frame. At least two joint holes are disposed at intervals in the vertical part of the right-angled buckling plate. A locking piece extending toward the inner side is disposed in each joint hole. A locating plate, which can correspond to the right-angled buckling plate, is disposed at the lower end of the cover plate. A plurality of fasteners is disposed on the locating plate of one cover plate, and a plurality of removable buckles is disposed on the locating plate of the other cover plate.

In another aspect of the present invention, two limiting hook pieces are respectively disposed at the two ends of the right-angled buckling plate. The locating plate, which can be inserted between the two limiting hook pieces, is disposed to correspond to the right-angled buckling plate.

In another aspect of the present invention, the lamp body comprises an M-shaped light-concentrating back panel. The LED base board is disposed in the center reflecting area of the light-concentrating back panel. The two cover plates are integrally connected to the light-concentrating back panel through the screws. A light-emitting surface group, which is disposed at the lower part of the light-concentrating back panel, is respectively connected to the light-concentrating back panel and the two corresponding cover plates in a matching way. Additionally, a quick-disassemble mechanism of the light-emitting surface group is disposed on the cover plate.

In another aspect of the present invention, the light-emitting surface group comprises two paralleled center beams, which are disposed at intervals. The two ends of the center beam are respectively fixed to the corresponding cover plate. A center light-emitting piece is disposed over the two center beams, and two removable light-emitting pieces are respectively disposed between the two center beams and the two side edges of the light-concentrating back panel.

In another aspect of the present invention, a slot is disposed on the center beam, and two hook frames are respectively disposed at the two side edges of the light-concentrating back panel. One side edge of the removable light-emitting piece can insert into the slot, and the other side edge of the removable light-emitting piece is disposed on the hook frame at the corresponding side. The quick-disassemble mechanism of the light-emitting surface group comprises two channel slots, allowing the removable light-emitting piece to insert through the two channel slots.

In another aspect of the present invention, a matching plate is connected between the corresponding ends of the two center beams. An assembly port, which can allow the center light-emitting piece to penetrate through the center beams, is disposed on the matching plate.

Compared with the prior art, the present invention has the following advantages:

Due to the reasonable structure of the present invention, the supporting frames can be pre-installed on the ceiling through the mounting plate, enabling the cover plates at the two ends of the lamp body to be respectively connected to the locking piece on the supporting frame through the fasteners and buckles. This arrangement can be assembled quickly, and, the lamp body can be integrally disassembled. Additionally, the present invention optimizes the assembly structure of the lamp body, allowing the removable light-emitting piece to be taken out from the channel slot during daily maintenance. Consequently, the light-emitting piece can be quickly cleaned and the LED base board can be easily replaced, avoiding the risk of operating at a high height.

BRIEF DESCRIPTION OF THE DRAWINGS

To clearly expound the present invention, the drawings and embodiments are hereinafter combined and described in detail. Obviously, the drawings are merely some embodiments of the present invention and those skilled in the art can associate themselves with other drawings without paying creative labor.

MARKING INSTRUCTION OF THE DRAWINGS

1. Lamp Body; 2. Supporting Frame; 3. Cover Plate; 11. Light-concentrating Back Panel; 12. LED Base Board; 13. Center Beam; 14. Center Light-emitting Piece; 15. Moving Removable Light-emitting Piece; 16. Slot; 17. Hook Frame; 18. Matching Plate; 19. Assembly Port; 21. Mounting Plate; 22. Locking Hole; 23. Joint Hole; 24. Locking Piece; 25. Folding Piece; 26. Right-angled Buckling Plate; 31. Fastener; 32. Removable Buckle; 33. Locating Plate; 34. Channel Slot.

DETAILED DESCRIPTION OF THE INVENTION

Drawings and detailed embodiments are combined hereinafter to elaborate the technical principles of the present invention.

Figure 1:
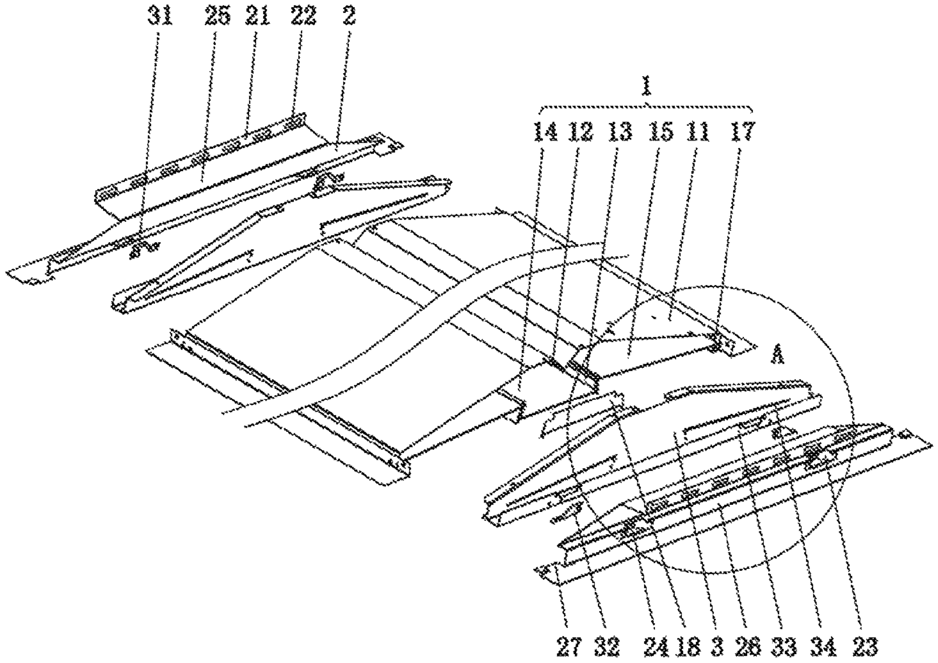
FIG. 1 is an abbreviated structure diagram of the explosive view of the present invention.
Figure 2:
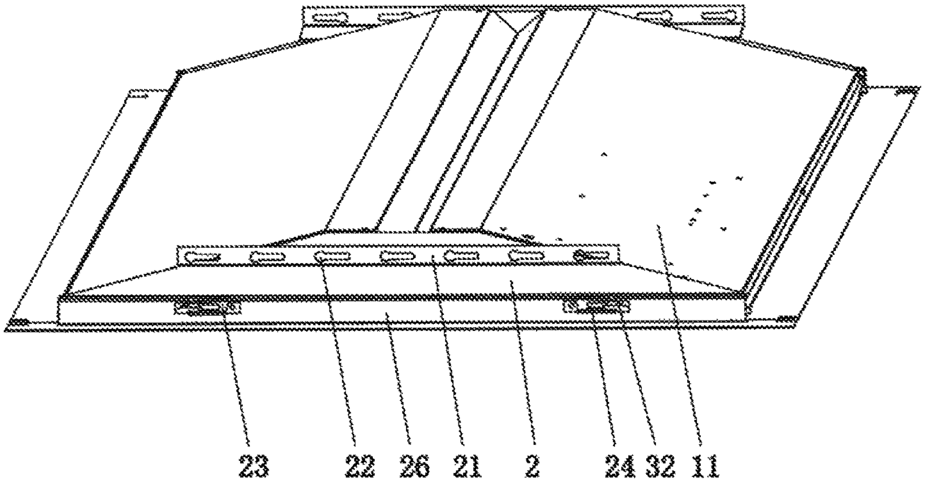
FIG. 2 is a schematic diagram of the integral assembly structure of the present invention.
Figure 3:
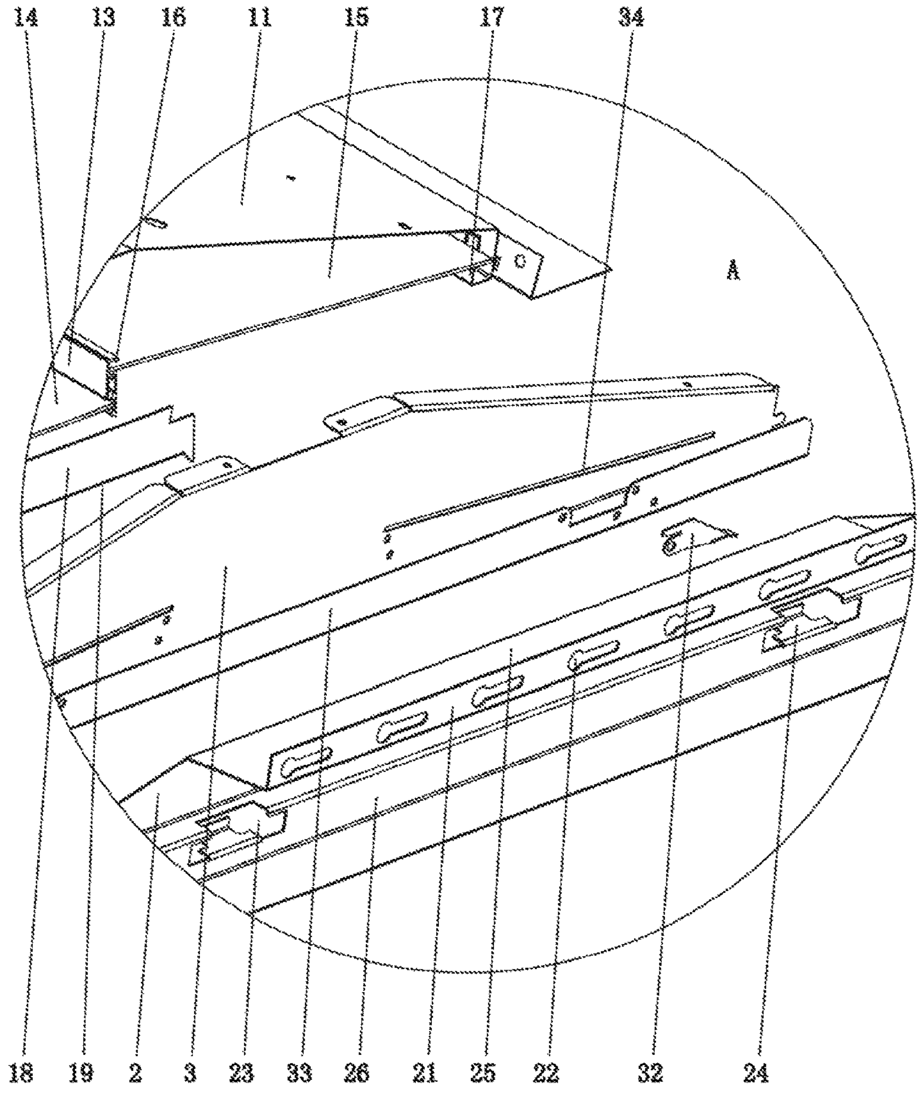
FIG. 3 is an enlarged structure diagram of the part A in FIG. 1.

As shown in FIGS. 1-3, the easy-maintaining LED lamp of the present invention comprises a lamp body 1, on which is disposed a mounting frame. The mounting frame comprises two supporting frames 2, which are connected to the corresponding two ends of the lamp body 1. The supporting frame 2 is vertically disposed, and a mounting plate 21 is disposed at the upper end of the mounting frame. A plurality of locking holes 22 is disposed on the mounting plate 21. At least two joint holes 23 are disposed at intervals on the supporting frame 2. A locking piece 24 extending toward the inner side is disposed in the joint hole 23. Two cover plates 3 are respectively disposed at the two ends of the lamp body 1. A plurality of fasteners 31, which is connected to the corresponding locking piece 24, is disposed at the outer side of one cover plate 3. Additionally, a plurality of Removable buckles 32, which is connected to the corresponding locking piece 24, is disposed at the outer side of the other cover plate 3. The supporting frame 2 is installed on the ceiling through the mounting plate 21, and a pre-embedded part can be disposed on the ceiling. The mounting plate 21 can be quickly connected to the pre-embedded part through the locking hole 22 so as to realize the overall positioning of the lamp body 1. The supporting frame 2 is made of sheet metal, enabling the joint hole 23 and the locking piece 24 in the joint hole 23 to be punch-formed. An upward-bending hook piece is disposed at the front end of the locking piece 24 so that the lamp body 1 can be quickly installed through the fasteners 31 and the removable buckles 32. The removable buckles 32 can be disassembled, allowing the lamp body 1 to be integrally disassembled during maintenance. Consequently, the components of the LED lamp can be cleaned and replaced on the ground, which effectively avoids the risk of operating at a high height and is easily maintained.

Additionally, a folding piece 25, which can extend horizontally toward the outer side, is disposed at the upper end of the supporting frame 2. The mounting plate 21 is vertically disposed, and the lower end of the mounting plate 21 is fixedly connected to the folding piece 25. A plurality of locking holes 22 is disposed at intervals on the mounting plate 21 along the horizontal direction. The supporting frame 2 enables the mounting plate 21 to extend to the outer side of the lamp body 1 through the folding piece 25. Consequently, a space can be left between the lamp body 1 and the ceiling, causing excellent heat-dissipation while the LEDs are working. When installing the lamp body 1, one end having the fasteners 31 is first connected to the supporting frame 2, and the other end having the removable buckles requires a certain space to connect to the supporting frame 2, protecting the ceiling from being damaged in the installation process.

A right-angled buckling plate 26 is disposed at the lower end of the support frame 2. At least two joint holes 23 are disposed at intervals in the vertical part of the right-angled buckling plate 26. A locking piece 24 extending toward the inner side is disposed in each joint hole 23. A locating plate 33, which can cooperate with the right-angled buckling plate 26, is disposed at the lower end of the cover plate 3. A plurality of fasteners 31 is disposed on the locating plate 33 of one cover plate 3, and a plurality of removable buckles 32 is disposed on the locating plate 33 of the other cover plate 3. The right-angled buckling plate 26 can form a height-limiting mechanism at the lower end of the supporting frame 2. Through the cooperation between the locating plate 33 and the right-angled buckling plate 26, the lamp body 1 is more stable and can be installed more effectively.

Two limiting hook pieces 27 are respectively disposed at the two ends of the right-angled buckling plate 26. The locating plate 33, which can penetrate between the two limiting hook pieces 27, is disposed to match the right-angled buckling plate 26. The limiting hook piece 27 can be used to cooperate with the right-angled buckling plate 26 to restrict the locating plate 33 in the horizontal plane, enabling the lamp body 1 to be precisely and efficiently assembled with the supporting frame 2.

Moreover, the lamp body comprises an M-shaped light-concentrating back panel 11. The LED base board 12 is disposed in the center reflecting area of the light-concentrating back panel 11. The two cover plates 3 are integrally connected to the light-concentrating back panel 11 through the screws. A light-emitting surface group, which is disposed at the lower part of the light-concentrating back panel 11, is connected to the corresponding light-concentrating back panel 11 and the two cover plates 3. A quick-disassemble mechanism of the light-emitting surface group is disposed on the cover plate 3. The quick-disassemble mechanism is used to disassemble the light-emitting surface group without disassembling the main structure of the lamp body 1. Consequently, the light-emitting piece is easy to clean and the LED base board 12 can be quickly replaced.

The light-emitting surface group comprises two paralleled center beams 13, which are disposed at intervals. The two ends of the center beam 13 are respectively fixed to the corresponding cover plate 3. A center light-emitting piece 14 is disposed over the two center beams 13, and two removable light-emitting pieces 15 are disposed between the two corresponding center beams 13 and the two side edges of the light-concentrating back panel 11. The two center beams 13, which are horizontally disposed on the light-emitting surface of the lamp body 1, can be connected to the cover plates 3 to form a supporting structure of the center light-emitting piece 14. The two center beams 13 can also cooperate with the side edge of the light-concentrating back panel 11 to form a supporting structure of the removable light-emitting piece 15.

Furthermore, a slot 16 is disposed on the center beam 13, and two hook frames 17 are respectively disposed at the two side edges of the light-concentrating back panel 11. One side edge of the removable light-emitting piece 15 can penetrate into the slot 16, and the other side edge of the removable light-emitting piece 15 is disposed on the hook frame 17 at the corresponding side. The quick-disassemble mechanism of the light-emitting surface group comprises two channel slots 34, allowing the removable light-emitting piece 15 to insert through the two channel slots 34. The removable light-emitting piece 15 is mounted on the light-emitting surface of the lamp body 1 through the cooperation between the slot 16 and the hook frame 17. When the lamp body is integrally disassembled, the removable light-emitting piece 15 can be removed from the channel slot 34 and quickly cleaned. Additionally, the LED base board 12 can be easily replaced and maintained after removing the removable light-emitting piece 15, thereby improving the safety and efficiency of the maintenance.

A matching plate 18 is connected between the corresponding ends of the two center beams 13. An assembly port 19, which can allow the center light-emitting piece 14 to penetrate through the assembly port 19, is disposed on the corresponding plate 18. The corresponding plate 18 is used to connect the two center beams 13 in the assembly process of the lamp body 1 so that the center beams 13 can be integrally assembled with the center light-emitting piece 14, and then subsequently assembled with the cover plate 3 and the light-concentrating back panel 11. In a preferred embodiment of the present invention, an assembly port 19 is disposed at the bottom edge of the matching plate 18, enabling the center light-emitting piece 14 to be easily removed during maintenance when the cover plate 3 at one side is disassembled.

The previous descriptions are of preferred examples for implementing the invention, and the scope of the invention should not necessarily be limited by this description. The scope of the present invention is defined by the claims.

The invention claimed is:

1. An easy-maintaining LED lamp, comprising:

a lamp body, wherein a mounting frame is disposed on the lamp body, wherein the mounting frame comprises two supporting frames that are connected to two corresponding ends of the lamp body, wherein the supporting frame is vertically disposed, and a mounting plate is disposed at the upper end of the mounting frame, wherein a plurality of locking holes are disposed on the mounting plate, wherein at least two joint holes are disposed at intervals on the supporting frame, wherein a locking piece extending toward the inner side is disposed in the joint hole, wherein two cover plates are respectively disposed at the two ends of the lamp body, wherein a plurality of fasteners, which are connected to the corresponding locking piece, are disposed at the outer side of one cover plate, wherein a plurality of removable buckles, which are connected to the corresponding locking piece, are disposed at the outer side of the other cover plate.

2. The easy-maintaining LED lamp of claim 1, wherein a folding piece, which can extend horizontally toward the outer side, is disposed at the upper end of the supporting frame, wherein the mounting plate is vertically disposed, and the lower end of the mounting plate is fixed to the folding piece, wherein said plurality of locking holes are disposed at intervals on the mounting plate along the horizontal direction.

3. The easy-maintaining LED lamp of claim 1, wherein a right-angled buckling plate is disposed at the lower end of the support frame, wherein at least two joint holes are disposed at intervals in the vertical part of the right-angled buckling plate, wherein said locking piece extending toward the inner side is disposed in each joint hole, wherein a locating plate, corresponding to the right-angled buckling plate, is disposed at the lower end of the cover plate, wherein said plurality of fasteners are disposed on the locating plate of one cover plate, and said plurality of removable buckles are disposed on the locating plate of the other cover plate.

4. The easy-maintaining LED lamp of claim 3, wherein two limiting hook pieces are respectively disposed at the two ends of the right-angled buckling plate, wherein the locating plate, which can be inserted into the two limiting hook pieces, is disposed to match the right-angled buckling plate.

5. The easy-maintaining LED lamp of claim 1, wherein the lamp body comprises an M-shaped light-concentrating back panel, and wherein a LED base board is disposed in the center reflecting area of the light-concentrating back panel, wherein the two cover plates are connected to the light-concentrating back panel through screws, wherein a light-emitting surface group, which is disposed at the lower part of the light-concentrating back panel, is connected to the corresponding light-concentrating back panel and the two cover plates, wherein a quick-disassemble mechanism of the light-emitting surface group is disposed on the cover plate.

6. The easy-maintaining LED lamp of claim 5, wherein the light-emitting surface group comprises two parallel center beams, wherein the two ends of each center beam are fixed to the corresponding cover plate, wherein a center light-emitting piece is disposed between the two center beams, and two removable light-emitting pieces are respectively disposed between the two center beams and the two side edges of the light-concentrating back panel.

7. The easy-maintaining LED lamp of claim 6, wherein a slot is disposed on the center beam, and two hook frames are respectively disposed at the two side edges of the light-concentrating back panel, wherein one side edge of the removable light-emitting piece can be inserted into the slot, and the other side edge of the removable light-emitting piece is disposed on the hook frame at the corresponding side, wherein the quick-disassemble mechanism of the light-emitting surface group comprises two channel slots, allowing the removable light-emitting piece to penetrate through the two channel slots.

8. The easy-maintaining LED lamp of claim 6, wherein a matching plate is connected between the corresponding ends of the two center beams, wherein an assembly port, which can allow the center light-emitting piece to penetrate through the two center beams, is disposed on the matching plate.

* * * * *